United States Patent
Habib et al.

(10) Patent No.: US 8,369,353 B1
(45) Date of Patent: Feb. 5, 2013

(54) DYNAMIC HETEROGENEOUS BACKHAUL

(75) Inventors: Ahsan Habib, Olathe, KS (US);
Pallavur Sankaranaraynan, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 557 days.

(21) Appl. No.: 12/014,946

(22) Filed: Jan. 16, 2008

(51) Int. Cl.
*H04J 3/00* (2006.01)

(52) U.S. Cl. .................................................. 370/464

(58) Field of Classification Search ............... 370/432, 370/431, 455, 442, 401, 437, 464; 455/73
See application file for complete search history.

(56) References Cited

U.S. PATENT DOCUMENTS

| | | | | |
|---|---|---|---|---|
| 5,479,480 | A | 12/1995 | Scott | |
| 5,485,474 | A * | 1/1996 | Rabin | 714/762 |
| 6,185,434 | B1 | 2/2001 | Hagstrom et al. | |
| 2004/0199662 | A1 * | 10/2004 | Karol et al. | 709/238 |
| 2004/0233843 | A1 * | 11/2004 | Barker | 370/225 |
| 2005/0265376 | A1 * | 12/2005 | Chapman et al. | 370/461 |
| 2006/0050719 | A1 * | 3/2006 | Barr et al. | 370/401 |
| 2006/0062242 | A1 * | 3/2006 | Dacosta | 370/464 |
| 2006/0229078 | A1 | 10/2006 | Itzkovitz et al. | |
| 2006/0256768 | A1 * | 11/2006 | Chan | 370/351 |
| 2007/0077932 | A1 | 4/2007 | Pi et al. | |
| 2007/0140220 | A1 | 6/2007 | Doradla et al. | |
| 2007/0140255 | A1 | 6/2007 | Gautier et al. | |
| 2008/0200166 | A1 * | 8/2008 | McCamon | 455/426.1 |
| 2009/0141683 | A1 * | 6/2009 | Grinshpun et al. | 370/331 |

OTHER PUBLICATIONS

Sklower et al. The PPP Multilink Protocol, Aug. 1996, IETF, RFC 1990, 1-25.*
Linux Devices; "Linux Powers Dual-Mode Multimedia Smartphone;" Mar. 7, 2007; 3 Pages; Linux Devices; http://www.linuxdevices.com/news/NS9521201305.html.
3GPP; "3rd Generation Partnership Project; Technical Specification Group Services and System Aspects; Voice Call Continuity between CS and IMS Study," Apr. 2005; 117 Pages; Release 7; Valbonne, France.

* cited by examiner

*Primary Examiner* — Mark Rinehart
*Assistant Examiner* — Christopher R Crompton

(57) ABSTRACT

A method of operating a communication system is disclosed. A first communication link of a first type is established to exchange communication traffic. A performance indicator for said first communication link is monitored. A second communication link of a second type is established. Based on the performance indicator, a portion of the communication traffic is moved from the first communication link to the second communication link.

13 Claims, 5 Drawing Sheets

DYNAMIC HETEROGENEOUS BACKHAUL

TECHNICAL BACKGROUND

Wireless communication may be used as a means of accessing a computer network. Wireless communications have certain advantages over wired communications for accessing a computer network. One of those advantages is a lower cost of infrastructure to provide access to many separate locations or addresses compared to wired communications. This is the so-called "last mile" problem. To use wireless communication to access a network, a customer premises needs to have at least one transceiver in active communication with another transceiver that is connected to the network. Typically, the cost of purchasing and installing these transceivers is much less than a wired connection to the customer's premises.

To facilitate wireless communications, the Institute of Electrical and Electronics Engineers (IEEE) has promulgated a number of wireless standards. These include the 802.11 (WiFi) standards and the 802.16 (WiMax) standards. Likewise, the International Telecommunication Union (ITU) has promulgated standards to facilitate wireless communications. This includes TIA-856, which is also known as Evolution-Data Optimized (EVDO). All of these standards may include specifications for various aspects of wireless communication with a network including processes for registering on the network, carrier modulation, frequency bands of operation, and message formats.

Overview

A method of operating a communication system is disclosed. A first communication link of a first type is established to exchange communication traffic. A performance indicator for said first communication link is monitored. A second communication link of a second type is established. Based on the performance indicator, a portion of the communication traffic is moved from the first communication link to the second communication link.

A communication system is disclosed. A first wireless modem is in wireless communication of a first type with a second wireless modem. A first network and a first device exchange communication traffic via the first and second wireless modems. A third wireless modem is in wireless communication of a second type with a fourth wireless modem. A monitor receives a performance indicator of the wireless communication of the first type. Based on the performance indicator, a traffic director moves a first portion of said communication traffic from said first and second wireless modems to said third and fourth wireless modems.

DETAILED DESCRIPTION

Figure 1:
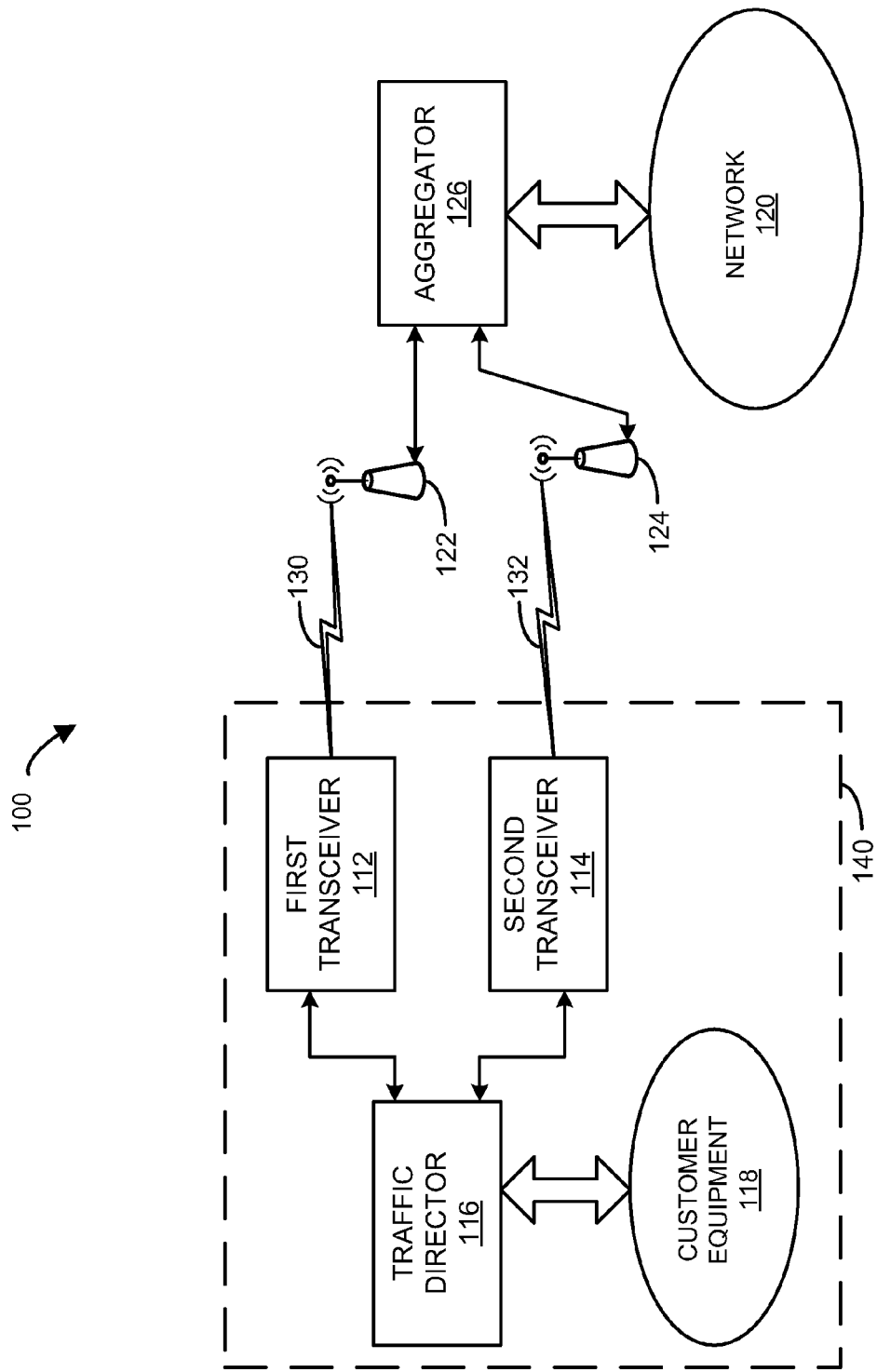
FIG. 1 is a block diagram illustrating a dynamic heterogeneous communication system.

FIG. 1 is a block diagram illustrating a dynamic heterogeneous communication system. In FIG. 1, communication system 100 comprises: first transceiver 112; second transceiver 114; traffic director 116; customer equipment 118; network 120; first base station 122; second base station 124; aggregator 126; first communication link 130; second communication link 132; and, customer premises 140.

Customer premises 140 is shown to include first transceiver 112, second transceiver 114, traffic director 116, and customer equipment 118. Customer premises 140 is intended as a concept to show physical proximity, such as a handset, fixed wireless installation, building, data center, switch closet, mounting location, or antenna service shack. Customer premises 140 is not intended to convey a strict metes and bounds description. It should also be understood, that the elements included in customer premises may be owned by different entities and may be physically distributed.

First transceiver 112 is operatively coupled to base station 122 via a first communication link 130. First communication link 130 is of a first type. For example, first communication link 130 may use WiMAX specified hardware and protocols. Accordingly, first transceiver 112 and first base station 122 may be configured to utilize WiMAX specified hardware and protocols. In another example, other communication hardware and protocols may be used.

Second transceiver 114 is operatively coupled to second base station 124 via a second communication link 132. Second communication link 132 is of a second type. For example, second communication link 132 may use EVDO specified hardware and protocols. Accordingly, second transceiver 114 and second base station 124 may be configured to utilize EVDO specified hardware and protocols. In another example, other communication hardware and protocols that are not the same as the first communication link 130 is using may be used by the second communication link 132.

First transceiver 112 is operatively coupled to traffic director 116. Second transceiver 114 is operatively coupled to traffic director 116. Traffic director 116 is operatively coupled to customer equipment 118.

First base station 122 is operatively coupled to aggregator 126. Second base station 124 is operatively coupled to aggregator 126. Aggregator 126 is operatively coupled to network 120. Thus, customer equipment 118 is operatively coupled to network 120 via one of two paths. The first path operatively couples customer equipment 118 to network 120 via traffic director 116, first transceiver 112, first communication link 130, first base station 122, and aggregator 126. The second path operatively couples customer equipment 118 to network 120 via traffic director 116, second transceiver 114, second communication link 132, second base station 124, and aggregator 126.

Network 120, first base station 122, second base station 124, and aggregator 126 may be part of a network or collection of networks that couple, link, or otherwise operatively connect first transceiver 112 and second transceiver 114 with other devices or systems via first base station 122 and second base station 124, respectively. Network 120 may include other secondary data networks. In an example, network 120 may include a backhaul network, a local network, a long distance network, or a packet network, the internet, or any combination thereof, as well as other types of networks.

Likewise, customer equipment 118 may include other secondary data networks. In an example, customer equipment 118 may include a backhaul network, a local network, a long distance network, or a packet network, Bluetooth transceiver, the internet, or any combination thereof, as well as other types of networks.

In an example, communication network 120, first base station 122, second base station 124, or aggregator 126 may be, or include all or parts of a WiMAX specified system. These parts may include an access services network (ASN), or connectivity service network (CSN).

The primary path for exchanging communication traffic between network 120 and customer equipment 118 includes the first transceiver 112, first communication link 130, and base station 122. Traffic director 116 or aggregator 126 monitors a performance indicator for this primary path. For example, the performance one or more of the path performance indicators of jitter, delay, packet loss, signal strength, available bandwidth, effective bandwidth, or signal to noise ratio may be monitored.

In another example, multiple path performance indicators may be combined to give a single performance indicator. Multiple path performance indicators may be combined by a weighting formula to produce a single performance indicator.

To illustrate, consider a case where there are three path performance indicators: X, Y, and Z. Each of X, Y, and Z is a number representing a path performance indicator. For example, X may be the packet delay in milliseconds. Y may be the mean jitter over the last two minutes, and so on. A performance indicator may be produced by a formula such as: $P=A*X+B*Y+C*Z^2$; where A, B, and C are constants and P is a performance indicator.

If a performance indicator meets criteria that show the performance of the primary path is below a predetermined limit, the traffic director 116 and aggregator 126 cooperate to shift traffic to a secondary path. This forms a combined link wherein the primary path carries part of the traffic and the secondary path carries part. The secondary path includes the second transceiver 114, the second communication link 132, and the second base station 124.

In an example, traffic director 116 and aggregator 126 may cooperate to exchange a set percentage of the traffic via the secondary path. In another example, traffic director 116 and aggregator 126 may incrementally increase the amount of traffic exchanged via the secondary path until a performance indicator of the combined link meets a criterion. For example, traffic director 116 and aggregator 126 may incrementally increase the amount of traffic exchanged via the secondary path until a performance indicator shows the performance of the combined path is above a predetermined limit.

In an example, traffic director 116 and aggregator 126 may cooperate to exchange at least some traffic via both the secondary path and the primary path. This redundant traffic may be used by traffic director 116 and/or aggregator 126 to improve the performance of the combined path.

The amount of redundant traffic carried via the secondary path may be based upon the primary path performance indicator. For example, a primary path performance indicator with a certain value may result in the exchanging of a certain volume of redundant traffic via the secondary path. In another example, traffic director 116 and aggregator 126 may incrementally increase the amount of redundant traffic exchanged via the secondary path until a performance indicator of the combined link meets a criterion.

In an example, traffic director 116 and aggregator 126 cooperate to exchange traffic via the secondary path by adding a unique header that directs the shifted traffic to aggregator 126 via the secondary path. Aggregator 126 examines the traffic with the unique header. Aggregator 126 strips off the unique header and aggregates this traffic with traffic received via the primary path. After these two traffic streams have been aggregated, they are sent to network 120. This process may also be operated in the opposite direction with aggregator 126 adding unique packet headers, traffic director 116 stripping off the unique headers, aggregating the traffic streams, and sending the aggregated stream to customer equipment 118.

Figure 2:
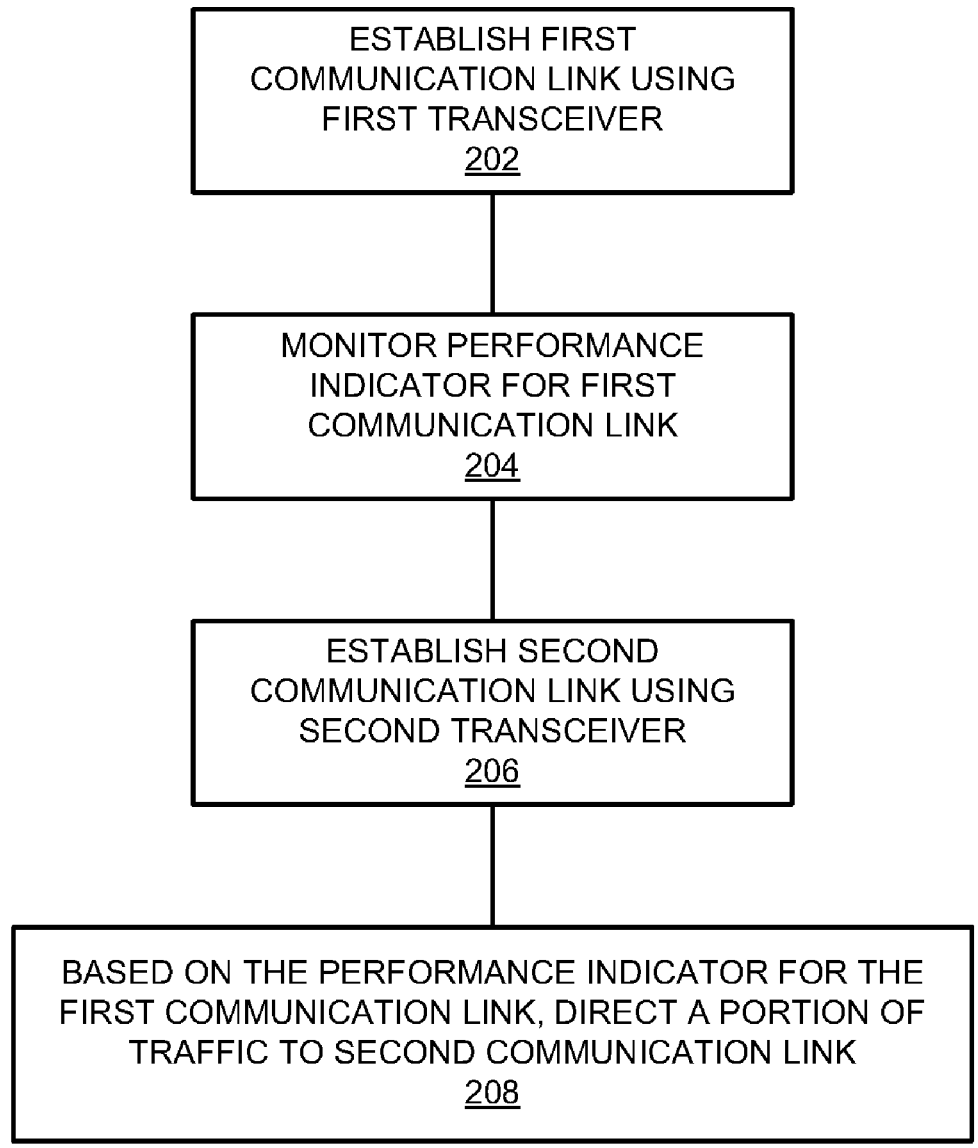
FIG. 2 is a flow chart illustrating a method of operating a dynamic heterogeneous communication system.

FIG. 2 is a flow chart illustrating a method of operating a dynamic heterogeneous communication system. The method illustrated by FIG. 2 may be performed by communication system 100.

A first communication link is established using a first transceiver (202). For example, a first communication link may be established using first transceiver 112 or first base station 122. In another example, a first communication link is established along a primary path between traffic director 116 and aggregator 126 via first transceiver 112 and first base station 122. In another example, a first communication link is established along a primary path between customer equipment 118 and network 120 via traffic director 116, first transceiver 112, first base station 122, and aggregator 126.

The first communication link established in step 202 is of a first type. For example, the first communication link may use WiMAX specified hardware and protocols. Accordingly, the hardware and software along the primary path may be configured to utilize WiMAX specified hardware and protocols. In another example, other communication hardware and protocols may be used.

A performance indicator for the first communication link is monitored (204). For example, traffic director 116 or aggregator 126 may monitor a performance indicator for the first communication link. One or more of the performance indicators of jitter, delay, packet loss, available bandwidth, effective bandwidth, signal strength, or signal to noise ratio may be monitored. Multiple performance indicators may be combined into a single performance indicator by formula or algorithms.

A second communication link is established using a second transceiver (206). For example, a second communication link may be established using second transceiver 114 or second base station 124. In another example, a second communication link is established along a secondary path between traffic director 116 and aggregator 126 via second transceiver 114 and second base station 124. In another example, a second communication link is established along a secondary path between customer equipment 118 and network 120 via traffic director 116, second transceiver 114, second base station 124, and aggregator 126.

The second communication link established in step 206 is of a second type. For example, the second communication link may use EVDO specified hardware and protocols. Accordingly, the hardware and software along the secondary path may be configured to utilize EVDO specified hardware and protocols. In another example, other communication hardware and protocols that are not the same as those used by the first communication link may be used.

Based on the performance indicator for the first communication link, a portion of the traffic exchanged by the first communication link is directed to the second communication link (208). For example, if a performance indicator meets criteria that show the performance of the first communication link is below a predetermined limit, the traffic director 116 and aggregator 126 may cooperate to shift traffic to the second communication link. This forms a combined link wherein the first communication link carries part of the traffic and the second communication link carries part.

In an example, a set percentage of the traffic originally on the first communication link may be moved to the second communication link. In another example, the amount of traffic moved from the first communication link to the second communication link may be incrementally increased until a performance indicator meets an acceptable criterion.

In an example, some traffic directed to the second communication link is duplicated on the first communication link. This redundant traffic may improve the combined performance of the first communication link and the second communication link. The amount of redundant traffic carried by the second communication link may be based upon a performance indicator. For example, a performance indicator with a certain value may result in the second communication link carrying a certain amount of redundant traffic. In another example, the amount of redundant traffic carried by the second communication link may be incrementally increased until a performance indicator meets an acceptable criterion.

Traffic may be directed to the second communication link by adding a unique header to data packets that directs these packets to the second communication link. Once these packets are received at a node that is common to the first communication link and the second communication link, the unique header may be stripped. These packets may then be combined with packets from the first communication link. The combined set of packets may then be sent on to their ultimate destination such as network 120 or customer equipment 118.

Figure 3:
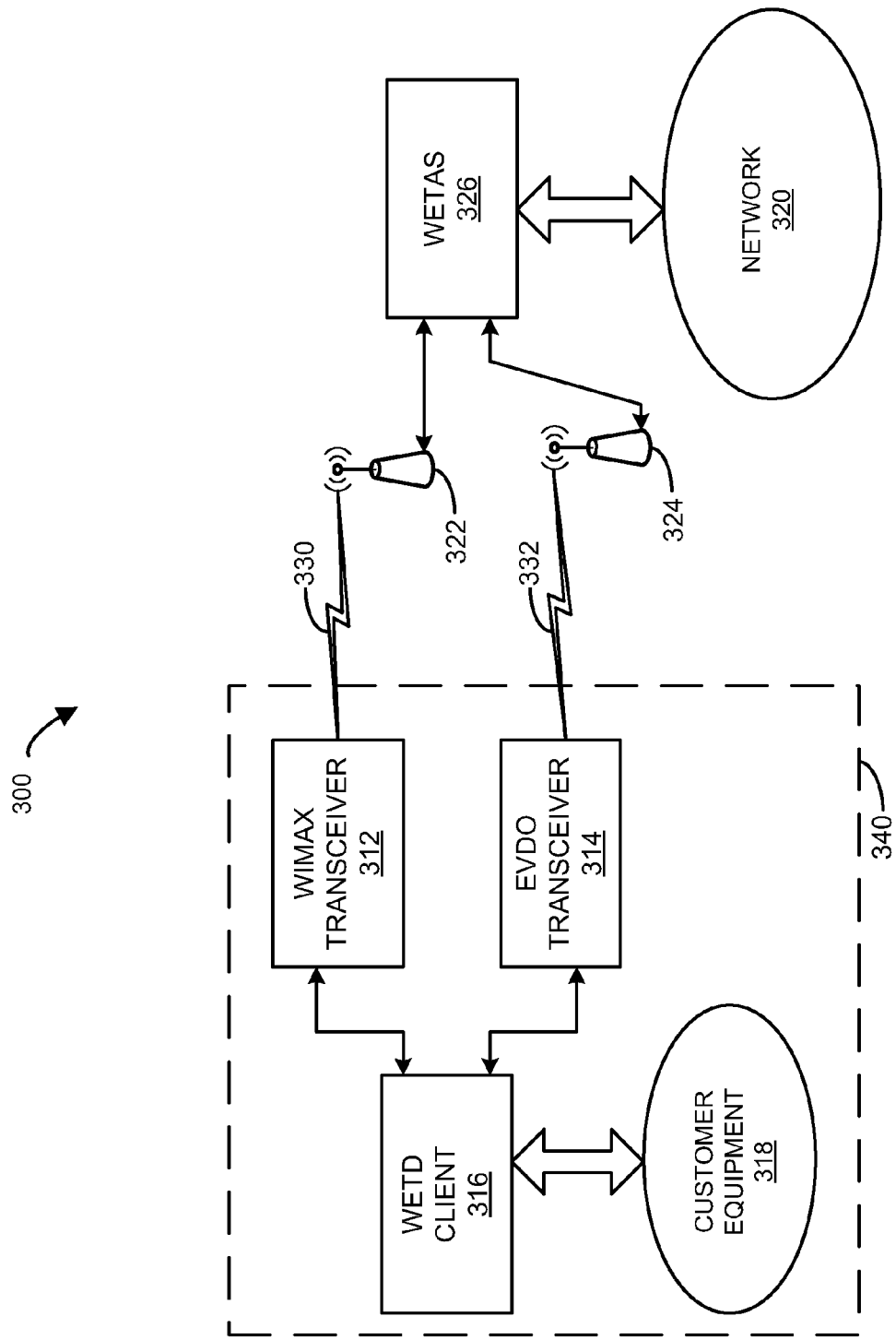
FIG. 3 is a block diagram illustrating a WiMAX-EVDO dynamic heterogeneous communication system.

FIG. 3 is a block diagram illustrating a WiMAX-EVDO dynamic heterogeneous communication system. In FIG. 3, communication system 300 comprises: WiMAX transceiver 312; EVDO transceiver 314; WiMAX-EVDO Traffic Director (WETD) client 316; customer equipment 318; network 320; WiMAX base transceiver 322; EVDO base transceiver 324; WiMAX-EVDO Traffic Aggregator Server (WETAS) 326; WiMAX wireless link 330; EVDO wireless link 332; and, customer premises 340.

Customer premises 340 is shown to include WiMAX transceiver 312, EVDO transceiver 314, WETD client 316, and customer equipment 318. Customer premises 340 is intended as a concept to show physical proximity, such as a handset, fixed wireless installation, building, data center, switch closet, mounting location, or antenna service shack. Customer premises 340 is not intended to convey a strict metes and bounds description. It should also be understood, that the elements included in customer premises may be owned by different entities and may be physically distributed.

WiMAX transceiver 312 is operatively coupled to WiMAX base transceiver 322 via a WiMAX wireless link 330. EVDO transceiver 314 is operatively coupled to EVDO base transceiver 324 via an EVDO wireless link 332.

WiMAX transceiver 312 is operatively coupled to WETD client 316. EVDO transceiver 314 is operatively coupled to WETD client 316. WETD client 316 is operatively coupled to customer equipment 318.

WiMAX base transceiver 322 is operatively coupled to WETAS 326. EVDO base transceiver 324 is operatively coupled to WETAS 326. WETAS 326 is operatively coupled to network 320. Thus, customer equipment 318 is operatively coupled to network 320 via one of two paths. The first path operatively couples customer equipment 318 to network 320 via WETD client 316, WiMAX transceiver 312, WiMAX wireless link 330, WiMAX base transceiver 322, and WETAS 326. The second path operatively couples customer equipment 318 to network 320 via WETD client 316, EVDO transceiver 314, EVDO wireless link 332, EVDO base transceiver 324, and WETAS 326.

Network 320, WiMAX base transceiver 322, EVDO base transceiver 324, and WETAS 326 may be part of a network or collection of networks that couple, link, or otherwise operatively connect WiMAX transceiver 312 and EVDO transceiver 314 with other devices or systems via WiMAX base transceiver 322 and EVDO base transceiver 324, respectively. Network 320 may include other secondary data networks. In an example, network 320 may include a backhaul network, a local network, a long distance network, or a packet network, the internet, or any combination thereof, as well as other types of networks.

Likewise, customer equipment 318 may include other secondary data networks. In an example, customer equipment 318 may include a backhaul network, a local network, a long distance network, or a packet network, Bluetooth transceiver, the internet, or any combination thereof, as well as other types of networks.

In an example, communication network 320, WiMAX base transceiver 322 or WETAS 326 may be, or include all or parts of a WiMAX specified system. These parts may include an access services network (ASN), or connectivity service network (CSN).

The primary path for exchanging communication traffic between network 320 and customer equipment 318 includes the WiMAX transceiver 312, WiMAX wireless link 330, and WiMAX base transceiver 322. WETD client 316 or WETAS 326 monitors a performance indicator for this primary path. For example, the performance one or more of the path performance indicators of jitter, delay, packet loss, available bandwidth, effective bandwidth, signal strength, or signal to noise ratio may be monitored.

In another example, multiple path performance indicators may be combined to give a single performance indicator. Multiple path performance indicators may be combined by a weighting formula to produce a single performance indicator.

To illustrate, consider a case where there are three path performance indicators: X, Y, and Z. Each of X, Y, and Z is a number representing a path performance indicator. For example, X may be the packet delay in milliseconds. Y may be the mean jitter over the last two minutes, and so on. A performance indicator may be produced by a formula such as: $P=A*X+B*Y+C*Z^2$; where A, B, and C are constants and P is a performance indicator.

If a performance indicator meets criteria that show the performance of the primary path is below a predetermined limit, the WETD client 316 and WETAS 326 cooperate to shift traffic to a secondary path. This forms a combined WiMAX-EVDO link wherein the primary path carries part of the traffic and the secondary path carries part. The secondary path includes the EVDO transceiver 314, the EVDO wireless link 332, and the EVDO base transceiver 324.

In an example, WETD client 316 and WETAS 326 may cooperate to exchange a set percentage of the traffic via the secondary path. In another example, WETD client 316 and WETAS 326 may incrementally increase the amount of traffic exchanged via the secondary path until a performance indicator of the combined WiMAX-EVDO link meets a criterion. For example, WETD client 316 and WETAS 326 may incrementally increase the amount of traffic exchanged via the secondary path until a performance indicator shows the performance of the combined WiMAX-EVDO path is above a predetermined limit.

In an example, WETD client 316 and WETAS 326 may cooperate to exchange at least some traffic via both the secondary path and the primary path. This redundant traffic may be used by WETD client 316 and/or WETAS 326 to improve the performance of the combined WiMAX-EVDO link.

The amount of redundant traffic carried via the secondary path may be based upon the primary path performance indicator. For example, a primary path performance indicator with a certain value may result in the exchanging of a certain volume of redundant traffic via the secondary path. In another example, WETD client 316 and WETAS 326 may incrementally increase the amount of redundant traffic exchanged via the secondary path until a performance indicator of the combined link meets a criterion.

In an example, WETD client 316 and WETAS 326 cooperate to exchange traffic via the secondary path by adding a unique header that directs the shifted traffic to WETAS 326 via the secondary path. WETAS 326 examines the traffic with the unique header. WETAS 326 strips off the unique header and aggregates this traffic with traffic received via the primary path. After these two traffic streams have been aggregated, they are sent to network 320. This process may also be operated in the opposite direction with WETAS 326 adding unique packet headers, WETD client 316 stripping off the unique headers, aggregating the traffic streams, and sending the aggregated stream to customer equipment 318.

Figure 4:
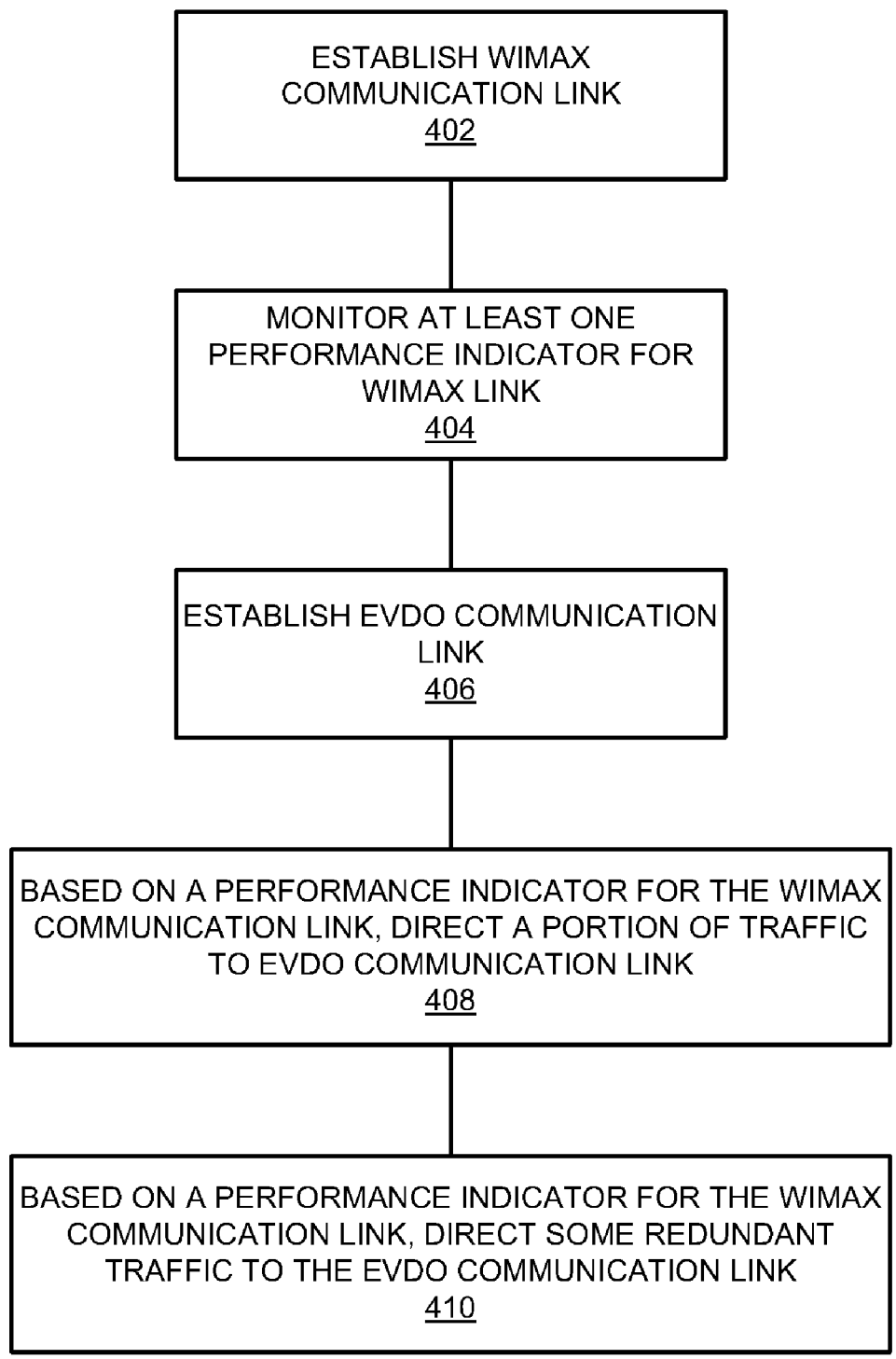
FIG. 4 is a flow chart illustrating a method of operating a WiMAX-EVDO dynamic heterogeneous communication system.

FIG. 4 is a flow chart illustrating a method of operating a WiMAX-EVDO dynamic heterogeneous communication system. The method illustrated by FIG. 4 may be performed by communication system 100 or communication system 300.

A WiMAX communication link is established (402). For example, a WiMAX communication link may be established using WiMAX transceiver 312 or WiMAX base transceiver 322. In another example, a WiMAX communication link is established along a primary path between WETD client 316 and WETAS 326 via WiMAX transceiver 312 and WiMAX base transceiver 322. In another example, a WiMAX communication link is established along a primary path between customer equipment 318 and network 320 via WETD client 316, WiMAX transceiver 312, Wimax base station transceiver 322, and WETAS 326.

A performance indicator for the WiMAX communication link is monitored (404). For example, WETD client 316 or WETAS 326 may monitor a performance indicator for the WiMAX communication link. One or more of the performance indicators of jitter, delay, packet loss, available bandwidth, effective bandwidth, signal strength, or signal to noise ratio may be monitored. Multiple performance indicators may be combined into a single performance indicator by formula or algorithms.

An EVDO communication link is established (406). For example, EVDO communication link may be established using EVDO transceiver 314 or EVDO base transceiver 324. In another example, an EVDO communication link is established along a secondary path between WETD client 316 and WETAS 326 via EVDO transceiver 314 and EVDO base station 324. In another example, an EVDO communication link is established along a secondary path between customer equipment 318 and network 320 via WETD 316, EVDO transceiver 314, EVDO base transceiver 324, and WETAS 326.

Based on the performance indicator for the WiMAX communication link, a portion of the traffic exchanged by the WiMAX communication link is directed to the EVDO communication link (408). For example, if a performance indicator meets criteria that show the performance of the WiMAX communication link is below a predetermined limit, the WETD client 316 and WETAS 326 may cooperate to shift traffic to the EVDO communication link. This forms a combined WiMAX-EVDO link wherein the WiMAX communication link carries part of the traffic and the EVDO communication link carries part.

In an example, a set percentage of the traffic originally on the WiMAX communication link may be moved to the EVDO communication link. In another example, the amount of traffic moved from the WiMAX communication link to the EVDO communication link may be incrementally increased until a performance indicator meets an acceptable criterion.

In an example, some traffic directed to the EVDO communication link is duplicated on the WiMAX communication link. This redundant traffic may improve the performance of the combined WiMAX-EVDO communication link. The amount of redundant traffic carried by the EVDO communication link may be based upon a performance indicator. For example, a performance indicator with a certain value may result in the EVDO communication link carrying a certain amount of redundant traffic. In another example, the amount of redundant traffic carried by the EVDO communication link may be incrementally increased until a performance indicator meets an acceptable criterion.

Traffic may be directed to the EVDO communication link by adding a unique header to data packets that directs these packets to the EVDO communication link. Once these packets are received at a node that is common to the WiMAX communication link and the EVDO communication link, the unique header may be stripped. These packets may then be combined with packets from the WiMAX communication link. The combined set of packets may then be sent on to their ultimate destination such as network 320 or customer equipment 318.

The methods, systems, devices, clients, servers, equipment, networks, transceivers, and base stations described above may be implemented with, contain, or be executed by one or more computer systems. The methods described above may also be stored on a computer readable medium. Many of the elements of communication network 100 and communication network 300 may be, comprise, or include computers systems. This includes, but is not limited to: first transceiver 112; second transceiver 114; traffic director 116; customer equipment 118; network 120; first base station 122; second base station 124; aggregator 126; customer premises 140; WiMAX transceiver 312; EVDO transceiver 314; WETD client 316; customer equipment 318; network 320; WiMAX base transceiver 322; EVDO base transceiver 324; WETAS 326; and, customer premises 340.

Figure 5:
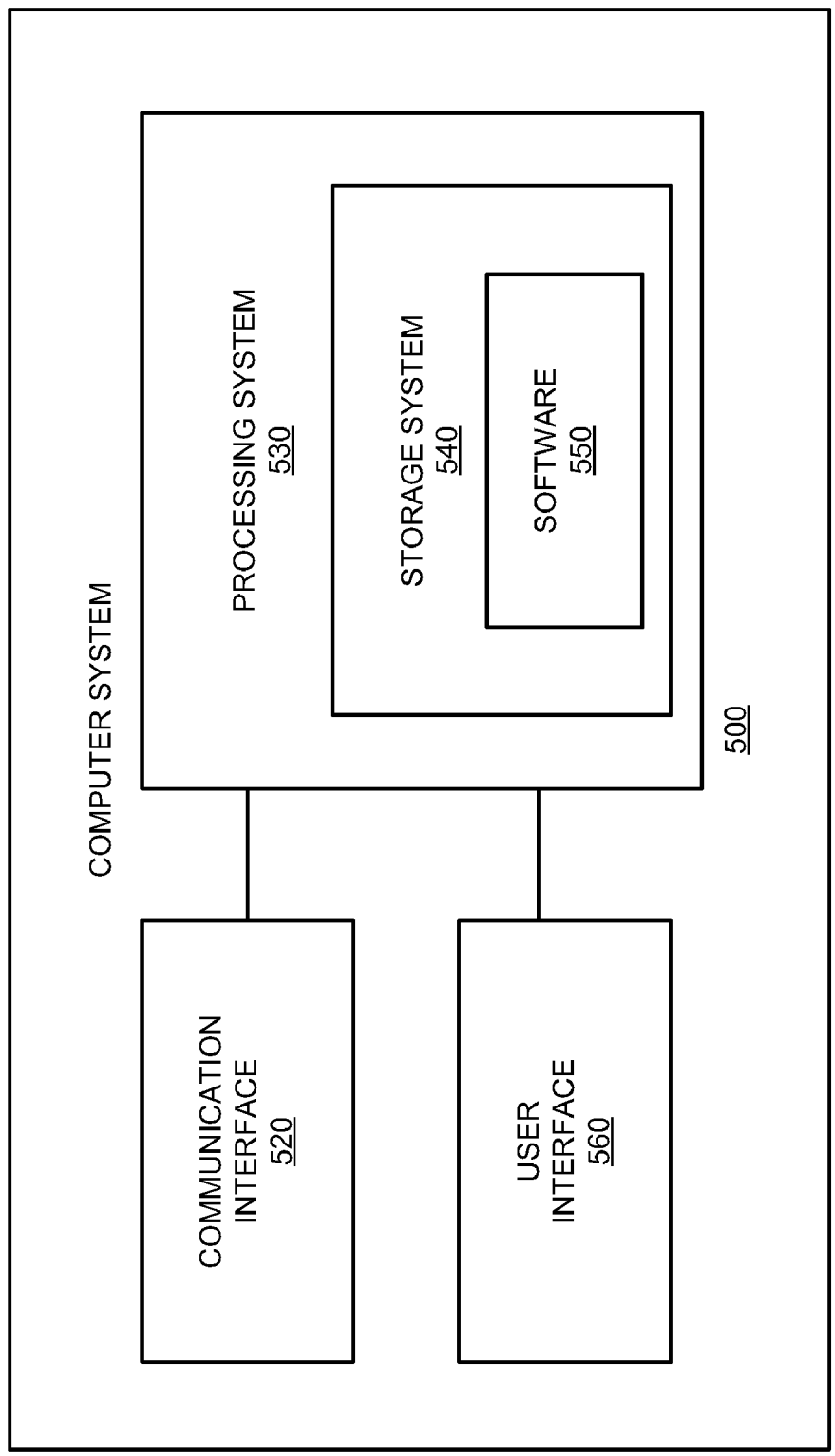
FIG. 5 is a block diagram illustrating a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    establishing a first communication link of a first type to exchange first communication traffic between customer equipment and an aggregation node of a communication network;
    monitoring a communication link performance indicator for the first communication link;
    establishing a second communication link of a second type to exchange second communication traffic between the customer equipment and the aggregation node of the communication network;
    moving a portion of the first communication traffic from the first communication link to the second communication link to include the portion of the first communication traffic in the second communication traffic using a header applied to the second communication traffic to direct the second communication traffic across the second communication link and identify at least the portion as associated with the first communication traffic, wherein a first amount of the portion of the second communication traffic is redundant with a first amount of the first communication traffic and a second amount of the portion of the second communication traffic is not redundant with the first communication traffic, and wherein the redundant amounts are based upon the communication link performance indicator;
    exchanging the second communication traffic over the second communication link and remaining first communication traffic over the first communication link; and
    in the aggregation node, aggregating the first communication traffic and the second communication traffic into common communication traffic based on the header applied to the second communication traffic and exchanging the common communication traffic over the communication network.

2. The method of claim 1, wherein the communication link performance indicator comprises a plurality of input variables.

3. The method of claim 1, wherein the first type comprises a first communication standard and the second type comprises a second communication standard.

4. The method of claim 3, wherein the first type comprises WiMAX (Worldwide Interoperability for Microwave Access) and the second type comprises EVDO (Evolution Data Optimized).

5. The method of claim 1, wherein the communication link performance indicator is based upon at least one of jitter, delay, packet loss, available bandwidth, effective bandwidth, signal strength, and signal to noise ratio.

6. A communication system, comprising:
    a first wireless modem in wireless communication of a first type with a second wireless modem, wherein a first network and a first device exchange first communication traffic via the first wireless modem and the second wireless modem over a first communication link;
    a third wireless modem in wireless communication of a second type with a fourth wireless modem, wherein the first network and the first device exchange second communication traffic via the third wireless modem and the fourth wireless modem over a second communication link;
    a monitor that receives a performance indicator of the wireless communication of the first type;
    a traffic director that moves a portion of the first communication traffic from the first communication link to the second communication link to include the portion of the first communication traffic in the second communication traffic using a header applied to the second communication traffic to direct the second communication traffic across the second communication link and identify at least the portion as associated with the first communication traffic, wherein a first amount of the portion of the second communication traffic is redundant with a first amount of the first communication traffic and a second amount of the portion of the second communication traffic is not redundant with the first communication traffic, and wherein the redundant amounts are based on the performance indicator;
    the traffic director configured to exchange the second communication traffic via the second communication link, and exchange remaining first communication traffic via the first communication link;
    an aggregation node configured to aggregate the first communication traffic and the second communication traffic into common communication traffic based on the header applied to the second communication traffic and exchange the common communication traffic over a communication network.

7. The communication system of claim 6, wherein the performance indicator is based on a plurality of input variables.

8. The communication system of claim 6, wherein the first type is specified by a first wireless communication specification and the second type is specified by a second wireless communication specification.

9. The communication system of claim 8, wherein the first type comprises WiMAX (Worldwide Interoperability for Microwave Access) and the second type comprises EVDO (Evolution Data Optimized).

10. The communication system of claim 6, wherein the performance indicator is based upon at least one of jitter, delay, packet loss, available bandwidth, effective bandwidth, signal strength, and signal to noise ratio.

11. A communication system, comprising:
    a first modem and a second modem that wirelessly exchange a first data stream using a first wireless protocol to exchange data of the first data stream over a first communication link between customer equipment and an aggregation node of a communication network;
    a third modem and a fourth modem and that wirelessly exchange a second data stream using a second wireless protocol to exchange data of the second data stream over a second communication link between the customer equipment and the aggregation node of the communication network;

a data stream director that receives a performance indicator measured by the first modem and, in response to the performance indicator, adjusts a relative volume of data carried by the first data stream as compared to the second data stream using a header applied to the second data stream to direct the second data stream across the second communication link and identify the second data stream as associated with the first data stream, wherein the first data stream and the second data stream each contain a first subset data stream of redundant data and a second subset data stream of non-redundant data, and wherein volumes of the redundant data streams are based on the performance indicator; and an aggregation node configured to aggregate the first data stream and the second data stream into a common data stream based on the header applied to the second data stream and exchange the common data stream over the communication network.

12. The communication system of claim 11, wherein the performance indicator is indicative of the available bandwidth of the first communication link between the first modem and the second modem.

13. A method of operating a communication system, comprising:

exchanging a first data stream between customer equipment and an aggregation node of a communication network over a first communication link using a first wireless protocol;

exchanging a second data stream between the customer equipment and the aggregation node of the communication network over a second communication link using a second wireless protocol;

in response to receiving a performance indicator that is indicative of an effective bandwidth of the first data stream, adjusting a relative volume of data carried by the first data stream as compared to the second data stream using a header applied to the second data stream to direct the second data stream across the second communication link and identify the second data stream as associated with the first data stream, wherein the first data stream and the second data stream each contain a first subset data stream of redundant data and a second subset data stream of non-redundant data, and wherein volumes of the redundant data streams are adjusted in response to changes in the performance indicator; and in the aggregation node, aggregating the first data stream and the second data stream into a common data stream based on the header applied to the second data stream and exchanging the common data stream over the communication network.

* * * * *